United States Patent
Le Blanc (10) Patent No.: US 9,951,948 B2
(45) Date of Patent: Apr. 24, 2018

(54) FIRE PIT GAS DELIVERY AND PAY-STATION SYSTEM PROVIDING GAS SERVICE ON A PAY-PER-USE BASIS

(71) Applicant: Eric Le Blanc, Murrieta, CA (US)

(72) Inventor: Eric Le Blanc, Murrieta, CA (US)

(*) Notice: Subject to any disclaimer, the term of this patent is extended or adjusted under 35 U.S.C. 154(b) by 330 days.

(21) Appl. No.: 15/009,560

(22) Filed: Jan. 28, 2016

(65) Prior Publication Data
US 2016/0327266 A1 Nov. 10, 2016

Related U.S. Application Data

(60) Provisional application No. 62/157,759, filed on May 6, 2015.

(51) Int. Cl.
| | |
|---|---|
| F23K 5/00 | (2006.01) |
| G06Q 20/18 | (2012.01) |
| G06Q 50/06 | (2012.01) |
| F23N 1/00 | (2006.01) |
| B67D 7/30 | (2010.01) |

(52) U.S. Cl.
CPC .............. *F23K 5/005* (2013.01); *B67D 7/305* (2013.01); *B67D 7/307* (2013.01); *F23K 5/007* (2013.01); *F23N 1/002* (2013.01); *G06Q 20/18* (2013.01); *G06Q 50/06* (2013.01); *F23N 2023/38* (2013.01)

(58) Field of Classification Search
CPC ......... F23K 5/005; F23K 5/007; B67D 7/305; B67D 7/307; G06Q 20/18; G06Q 50/06; G05D 7/0635; G05D 7/0664; G05B 15/02; F23N 1/002; F23N 1/005; F23N 2023/38
See application file for complete search history.

(56) References Cited

U.S. PATENT DOCUMENTS

| | | | | | |
|---|---|---|---|---|---|
| 3,927,800 | A | * | 12/1975 | Zinsmeyer | B67D 7/228 222/26 |
| 5,394,336 | A | * | 2/1995 | Warn | B67D 7/08 700/236 |
| 5,586,050 | A | * | 12/1996 | Makel | B67D 7/08 340/5.92 |
| 8,783,307 | B2 | * | 7/2014 | Ding | F17C 5/007 141/197 |
| 2007/0207429 | A1 | * | 9/2007 | Barker | F23D 14/28 431/328 |

* cited by examiner

*Primary Examiner* — Ryan A Reis (57) ABSTRACT

Embodiments of the invention relate to a gas fire pit delivery and pay-station system for providing a gas service on a pay-per-use basis. The system provides a multi pay-station or a single pay-station configuration connected to a main gas supply of pressurized gas whereby a control signal is provided by the pay-station to a plurality of electronically controlled gas valves for disabling or enabling the pressurized gas to flow to one or more fire pit stations.

14 Claims, 9 Drawing Sheets

FIRE PIT GAS DELIVERY AND PAY-STATION SYSTEM PROVIDING GAS SERVICE ON A PAY-PER-USE BASIS

RELATED APPLICATIONS

This application claims the benefit of priority of U.S. Provisional Application Ser. No. 62/157,759 filed May 6, 2015, which is hereby incorporated by reference in its entirety.

FIELD OF THE INVENTION

The present invention relates to an outdoor campfire pit. More particularly, the present invention pertains to an outdoor fire pit system which prevents the unnecessary wasting and usage of wood. Further, the present invention provides an opportunity for camp ground and beach fire pit owners to recoup costs by charging for the usage of gas at pay stations.

BACKGROUND

When camping or out on the beach, it is often convenient to have a bonfire or similar outdoor campfire pit for generating warmth, for cooking, or for protection from wildlife. These outdoor fire pits can be created or formed by creating a barrier by stones, wherein afterward twigs, logs, and the like can be utilized for kindling and producing a fire. The method of utilizing nature for producing a fire results in the unnecessary destruction of trees, which can have adverse impact on the natural landscape of the area. Further, these fire pits, which utilize wood and leaves, produce harmful, cancer causing carcinogens when lit and increases the risk secondary fires such as brush fires caused by embers. For example, the smoke generated by the use of outdoor fire pits contributes to unnecessary air pollution and generally have constituents, such as dusts and solvents, contributing to lung disorders and cancer-causing deaths. Additionally, because of the downsides of making fire pits from nature, some cities have banned the use of wood at beaches and campgrounds during summer months, thus requiring the use of gas in order to produce a fire.

In order to address the harmful production of smoke contributing to air quality reduction caused by outdoor fire pits and preserve the trees within an area, solutions have been provided that eliminate the use of smoke-generating fuel sources (i.e., wood) and therefore need to cut down and destroy trees. A convenient solution for eliminating the harmful smoke and the deforestation of trees is to provide portable campfires. These portable outdoor campfire pits allow for an individual to produce a campfire in any location, and therefore meet the needs of an individual. These fire pits often include artificial logs, charcoal, and other adornments that simulate a natural fire pit. Other devices provide a barrier-type ring which comprises an open interior for keeping and maintaining a fire, by often utilizing logs.

In each solution, however, the aforementioned devices require the transportation of a gas canister, which has a limited supply, and thus limits the amount of time that a fire is produced. Further, each of these devices requires constant checking of the flame in order to ensure that the supplied gas has not run out. Additionally, these devices fail to provide an automatic shut-off mechanism or self-controlling shut-off device in order to eliminate the wasteful usage of gas (Propane, Butane, and the like). Therefore, there is a need for a device that allows for the gas supplied to a campfire to be carefully monitored and completely controlled by the user, thereby preventing overuse as well as eliminating the risk of the fire prematurely going out.

SUMMARY

The present invention, however, overcomes the downsides identified in the prior invented portable campfires as well stationary bonfire rings, including eliminating the risk of overusing gas as well as the risk of having the supplied gas emptying. The present invention overcomes the downsides of the known devices by providing an outdoor campfire pit that receives gas from a gas line or enlarged gas tank which is regulated by a prepaid gas meter, thereby allowing for enhanced control of the fire pit. Further, the present invention allows for the adjustment of usage as well as enabling an individual to control the delivery of gas at the fire pit. This is accomplished by providing a pay meter electrically connected to an enlarged tank or gas line in order to provide a regulated amount of gas to the fire pit. Additionally, the present invention allows for the gas supplier at a camp ground or beach bonfire pits to offset utility costs by charging for gas usage at the pay stations. Furthermore, this invention may benefit cities, municipalities, state parks and campground owners who operate and offer outdoor fire pits by reducing or eliminating the added expense of clean-up and law enforcement or security that are needed to enforce fire prevention rules and regulations. Therefore, this invention may recoup cost to operators of outdoor fire pits by providing alternative smoke-free fire pit stations using natural or LP gas to users and may reduce or eliminate costs of enforcing fire prevention and safety as mentioned hereinabove.

These and other objects, features and advantages of the present invention will become more apparent in light of the following detailed description of preferred embodiments thereof, as illustrated in the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION

The present invention provides a benefit for campsite owners, municipalities, and cities by providing a device that monitors gas usage and also provides a way to eliminate unsafe campfire practices. The primary embodiment of the present invention includes a singular gas supply which provides gas to multiple prepared fire pit sites, wherein the supplied gas can come from a gas line or from an enlarged tank. In general, the gas supply may be connected to one or more pay stations which control the multiple prepared campfire sites. The pay station receives currency therein (cash, coin, credit/debit cards/prepaid cards) and includes a user interface which allows for the selection of a pre-determined amount of gas to flow to a selected site. After the allotted amount of time has elapsed, the electrical connection of the pay station may cut-off the supply of gas to the site, thus ending the fire. The present invention, therefore, allows for a supplier of gas to recoup costs of utilizing a fire pit by requiring that an individual have to utilize a pay station to receive gas. Further, the present invention provides a benefit for a consumer by eliminating the need to purchase or travel with wood, which may include paint, nails, and other harmful and unwanted materials thereon that should not be burned. In addition, this invention may recoup cost to cities, municipalities, state parks and campground owners by providing alternative smoke-free fire pit using natural or LP gas to users and may reduce or eliminate costs and burden of enforcing fire prevention and safety as mentioned hereinabove. These outdoor fire pits may include a variety of outdoor fires, including that as utilized for bonfires, beach fire pits, campground fire pits, grilling purposes and the like.

Figure 1:
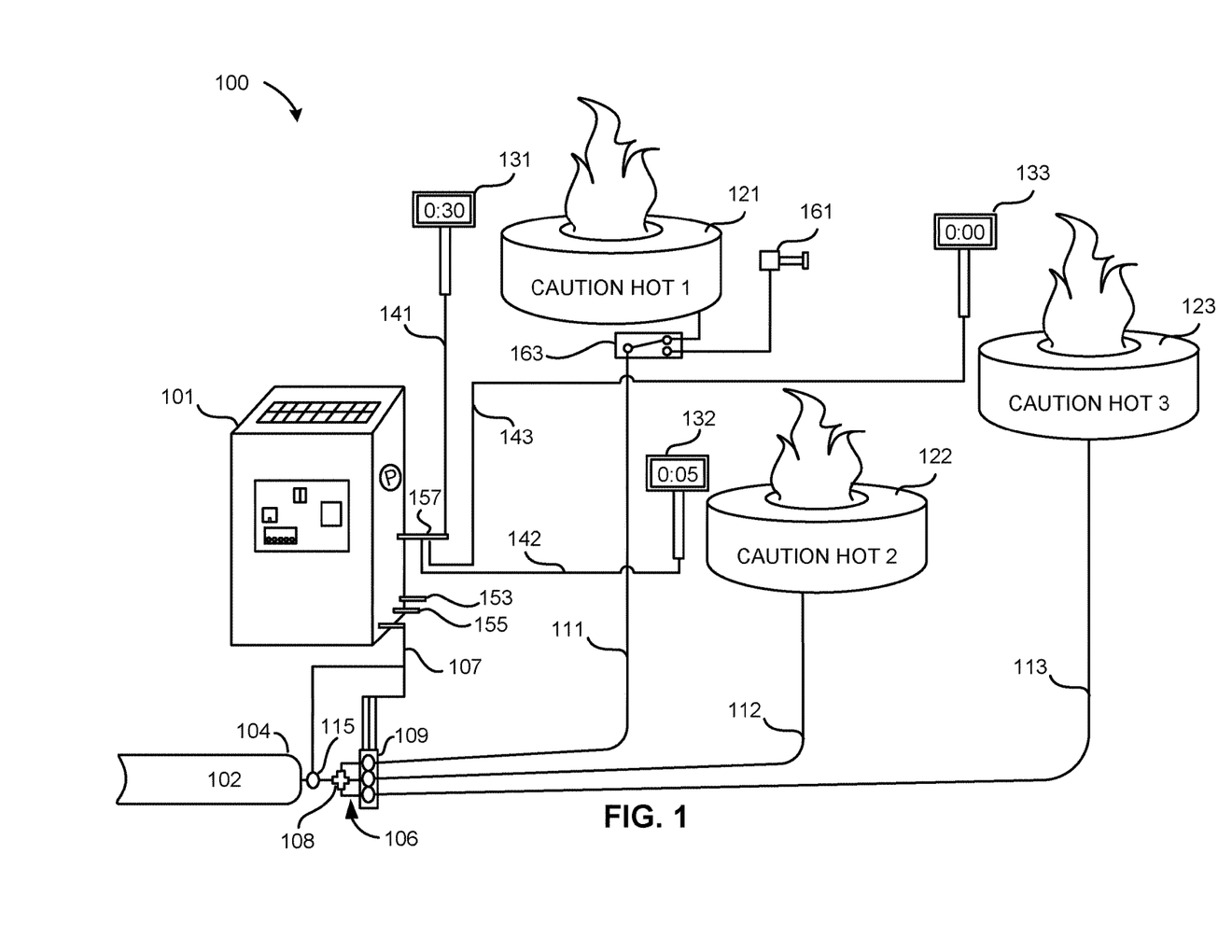
FIG. 1 illustrates a drawing of a gas fire pit delivery system having a multi-pay station, in accordance with an embodiment of the present invention.

In one embodiment of the present invention, FIG. 1 illustrates a gas delivery system 100 having a multi pay-station 101 for controlling and regulating a main gas supply 102 of pressurized gas (e.g., natural gas or liquid propane (LP)) to a plurality of fire pits (111, 112, 113), thereby insuring that the main gas supply 102 is not used in excess. As shown in this embodiment, the multi pay-station 101 is a central payment machine such as, for example, an interactive kiosk or vending machine, for providing gas service on a per-use basis to one or more of the fire pits (111, 112, 113). Further, the gas delivery system 100 ensures that the main gas supply 102 provided by a gas supplier or gas storage site (e.g., an owner of a local propane tank or a public service facility such as a campsite, state park, RV park, or the like, providing natural gas service to its customers) can be compensated for use of the present invention. Such compensation may be accomplished by requiring an individual to prepay the multi pay-station 101 to use a selected fire pit for a pre-determined period of time. The location of the multi pay-station 101 may be conveniently installed at main office of the facility or at a central area near the fire pits.

In the gas delivery system 100, a plurality of electronically controlled gas valves 109 are coupled to a distribution end 104 of the main gas supply 102 through gas lines 106. Each gas lines 106 may be directly connected to the distribution end 104 or connected to the distribution end 104 using a multi-way gas splitter 108. The multi pay-station 101 may be coupled to a plurality of gas valves 109 by a controller cable 107, whereby the multi pay-station 101 provides power and a signal to actuate and regulate one or more of the plurality of gas valves 109 to deliver pressurized gas (natural gas or liquid propane) to one or more of the fire pits (121, 122, 123) via gas lines (111, 112, 113), respectively. An input gas solenoid valve 115 may be attached at the output of the distribution end 104 whereby the multi pay-station 101 may generate a signal to actuate the input gas solenoid valve 115 to disable and enable gas flow to all gas lines 106. The multi pay-station 101 may be programmed with "on/off" time as to enable/disable fire pits at a specific time. This allows the multi pay-station 101 to automatically turn-on and shut-off the gas supply to all bonfire pits at once. In operation, owners or operators of the fire pit stations may program the multi pay-station 101 to enforce curfews at specific times, eliminating the need for law enforcement or security officers who are typically responsible for enforcing the fire pit curfews after the specific time. In one implementation, the controller cable 107 may include an insulated wire cable harness or assembly having multiple wires of various gauges. The gas valves 109 may include, for example, an electric solenoid valve providing on-off control of gas using a DC signal. In practice, the valve generally operates using an electric on-off switch powered by a controller and can only open when power or a DC signal is applied by the controller.

In yet another implementation, each fire pit may include a weatherproof protective barrier with a gas distribution end or gas hose attachment 161 and a gas changeover or selector valve 163. The weatherproof protective barrier acts as a wind shield for pilot burners located on each fire pit station to prevent the pilot flame from going out. The gas hose attachment 161 may be adapted to connect directly to portable bonfire pits, gas grills, or portable gas heaters. In addition, each gas line (111, 112, 113) may include a gas changeover or selector valve 161 located at each fire pit, providing a mechanism to switch the gas between the fire pits (121, 122, 123) and the gas hose attachment. The gas changeover or selector valve 163 may include an automatic switch or a manual switch such as lever or handle.

Optionally, each fire pit (121, 122, 123) may come equipped with a digital timer (131, 132, 133), respectively, for displaying the remaining time period for each fire pit. Each digital timer (131, 132, 133) may include a large color display screen that provides different colors based on whether the fire pit is in use. For example, for fire pit stations that are available (i.e., not in use), the large color display screen may appear green. Whereas, an occupied fire pit stations are indicated by a red color display screen. In addition to the gas controller cable 107, the multi pay-station 101 may come equipped with other cables such as a main power cable 153 which is connected to an external power source such as an underground utility line, transformer unit, or the like, an Ethernet cable 155 which is connected to external data communication link such as a server, router or hub, and a remote cable 157 which is connected to digital timers (131, 132, 133) through hardwire lines (141, 142, 143). Specific features and implementations of each cable as it relates to other components of the multi pay-station 101 are further described herein below.

Figure 2:
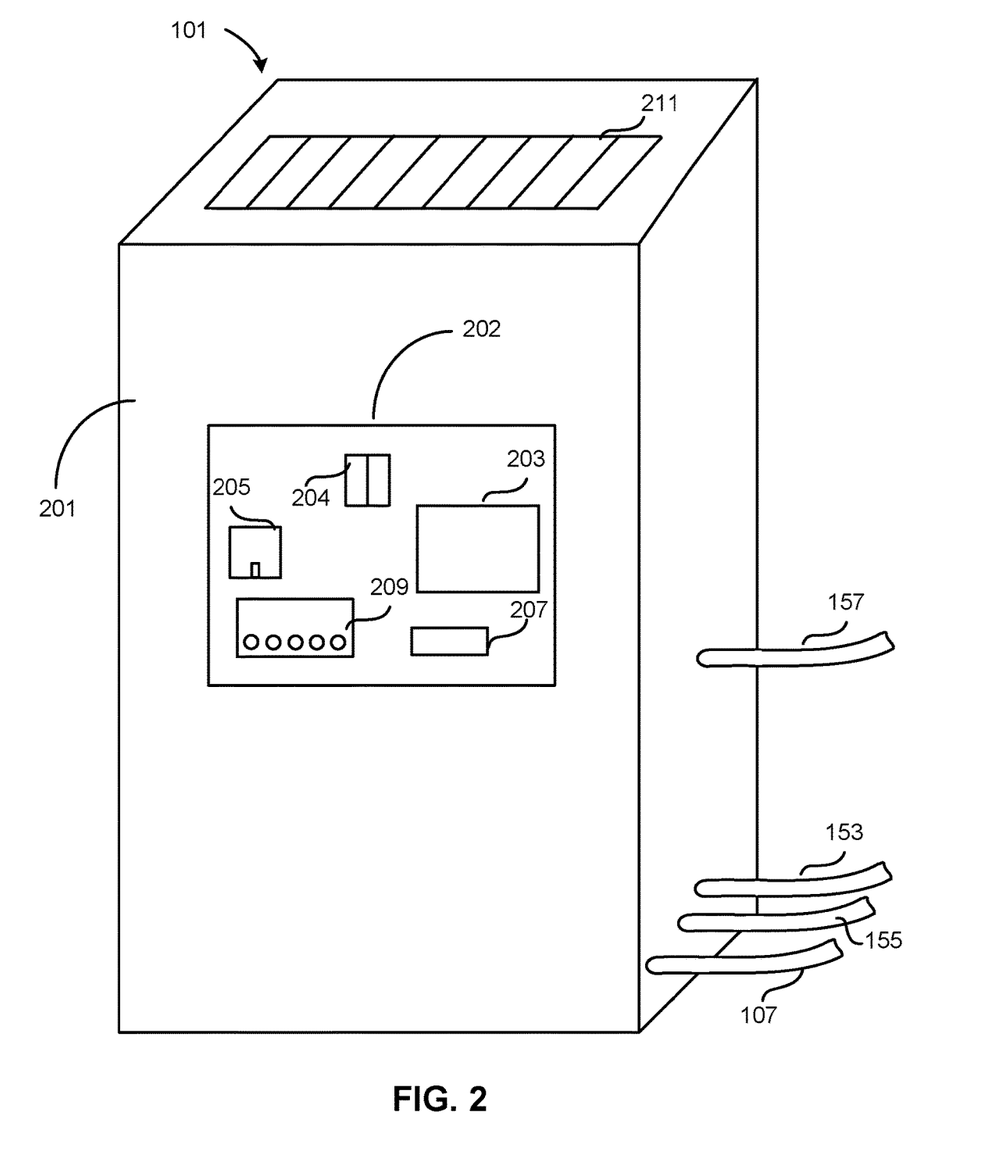
FIG. 2 illustrates a drawing of external components of the multi-pay station, in accordance with an embodiment of the present invention.

FIG. 2 illustrates external components of the multi pay-station 101 for providing customer transactions and gas selection functions. The multi pay-station 101 includes a weatherproof enclosure cabinet 201 having a durable frame for supporting hardware and electrical components and a weatherproof control panel 202 for handling the fire pit selection and payment transactions by a customer. The control panel 202 may include a touchscreen display 203 for data input and outdoor fire pit selection, a payment card reader 204, such as a point of sale terminal, or a cash or coin acceptor 205 for receiving payment from the customer, a receipt dispenser 207 for dispensing a paper receipt to the customer, and optional selector buttons 209 for user selection and input. These buttons 209 may include, for example, an OK button, ARROW UP/DOWN buttons, and a CANCEL button. The multi pay-station 101 is equipped to receive and transmit data over external sources as well as power over a number of external cables as mentioned hereinabove. For example, the multi pay-station 101 includes the main power cable 153 for supplying electricity between 120 VAC-240 VAC/15-20 Amps from a power utility line to the multi pay-station 101, the Ethernet cable 155 for providing a medium to a data network connection with Internet access, and the gas controller cable 107 for providing a medium for communicating the actuating signal to the gas valves 109 as described hereinabove, and the digital remote cable 157 for transmitting timing data to the digital timers (131, 132, 133). Optionally, the multi pay-station 101 may operate using an alternative power source such as a solar panel 211 adapted fit on top of the enclosure cabinet 201 of the multi pay-station 101.

Figure 3:
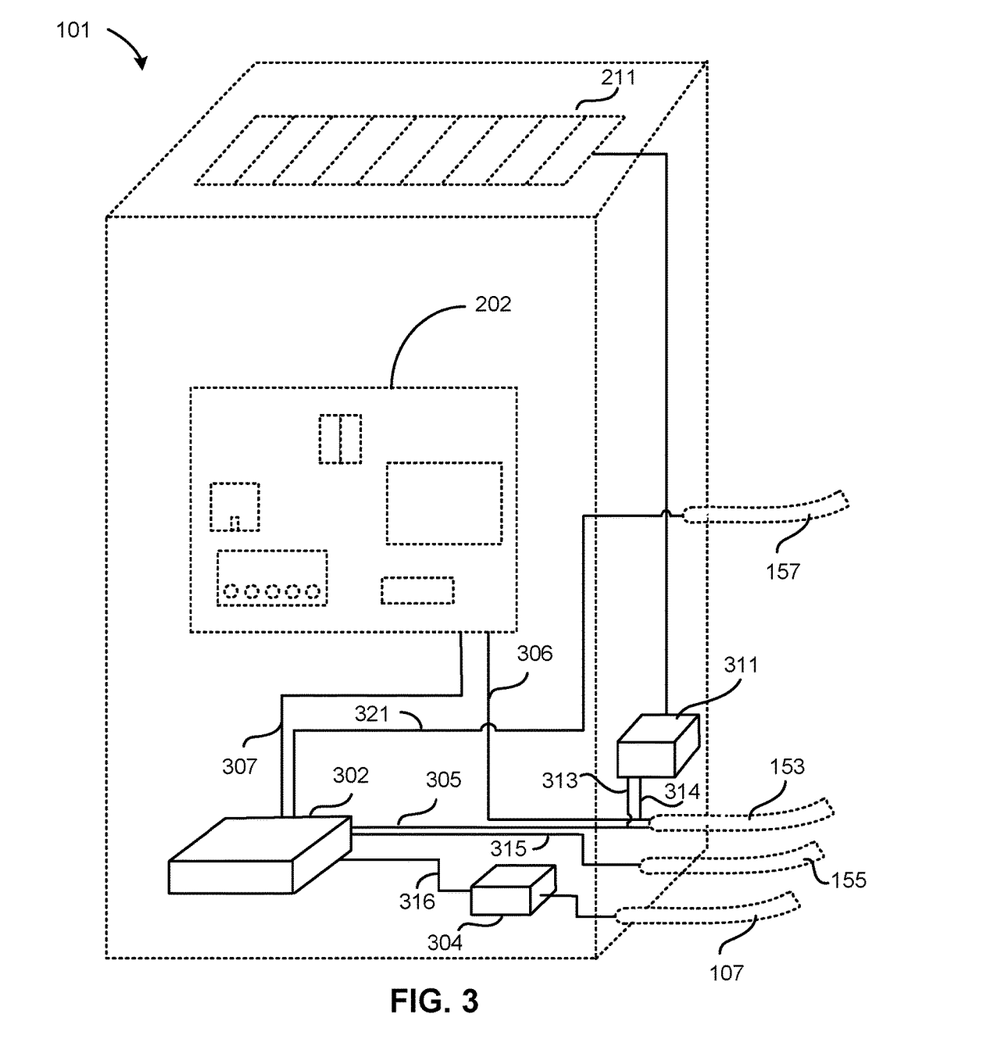
FIG. 3 illustrates a drawing of internal components of the multi-pay station, in accordance with an embodiment of the present invention.

Contained within the weatherproof enclosure cabinet 201 are internal components for processing the fire pit selection and payment transactions as shown in FIG. 3. These internal components of the multi pay-station 101 may include an electronic computing device 302 having a microprocessor (CPU), a storage device, and network communication capability. Other internal components may include a multi-channel valve controller 304 and a solar converting unit 311. Power is delivered from the main power cable 153 to the electronic device 302 over a first wire 305 and the weatherproof control panel 202 over a second wire 306, supplying power to the touchscreen display 203, card reader 204, receipt dispenser 207, light indicators (not shown), and the electronic computing device 302. The electronic computing device 302 may also be internally equipped with a network communication port such as an Ethernet card and port which is connected to the Ethernet cable 155 over RJ45 line 315 for providing communication and data access over the Internet or a remote server (not shown). Upon selection of the fire pit and payment confirmation by the customer, the electronic computing device 302 is configured to transmit a corresponding signal to the multi-channel valve controller 304 over gas data line 316 for the selected fire pit by the customer for a pre-determined period of time determined by the electronic computing device 302. Timing data corresponding to the pre-determined time is transmitted by the electronic device 302 to the digital timers (131, 132, 133) via timing line 321 and the digital remote cable 157. Such pre-determined time may include, for example, a selection of various fire pit run-time options (in minutes) which presented to the customer on the touchscreen display 203.

The multi-channel valve controller 304 may actuate multiple channels of DC solenoid valves 109 (open and closed). Multiple stacks of valve controllers may be stacked in parallel to control 4 channels or greater. Each channel may be configured an optional USB network. Computer input/output may include digital input digital output, serial (RS-232), USB, and analog input. The multi-channel valve controller 304 is programmable and supports keypad or remote programming. The multi-channel valve controller 304 supports real-time analog or digital outputs and data acquisition to monitor the gas valves 109. The electronic computing device 302 may include valve controlling software to pre-program the multi-channel valve controller 304.

Optionally, the multi pay-station 101 may operate using an alternative power source such as a solar panel array 211 adapted fit on top of the enclosure cabinet 201 of the multi pay-station 101. The solar panel array 211 may be configured to produce a 12V-24V DC power supply to the solar converting unit 311 having a charge controller, an optional rechargeable power supply (i.e., lithium, NiCad, Alkaline batteries) and a DC-to-AC inverter, and further provide a backup power supply to operate the electronic device 302 and the main panel 202 over a battery cable wires (313, 314) respectively.

Figure 4:
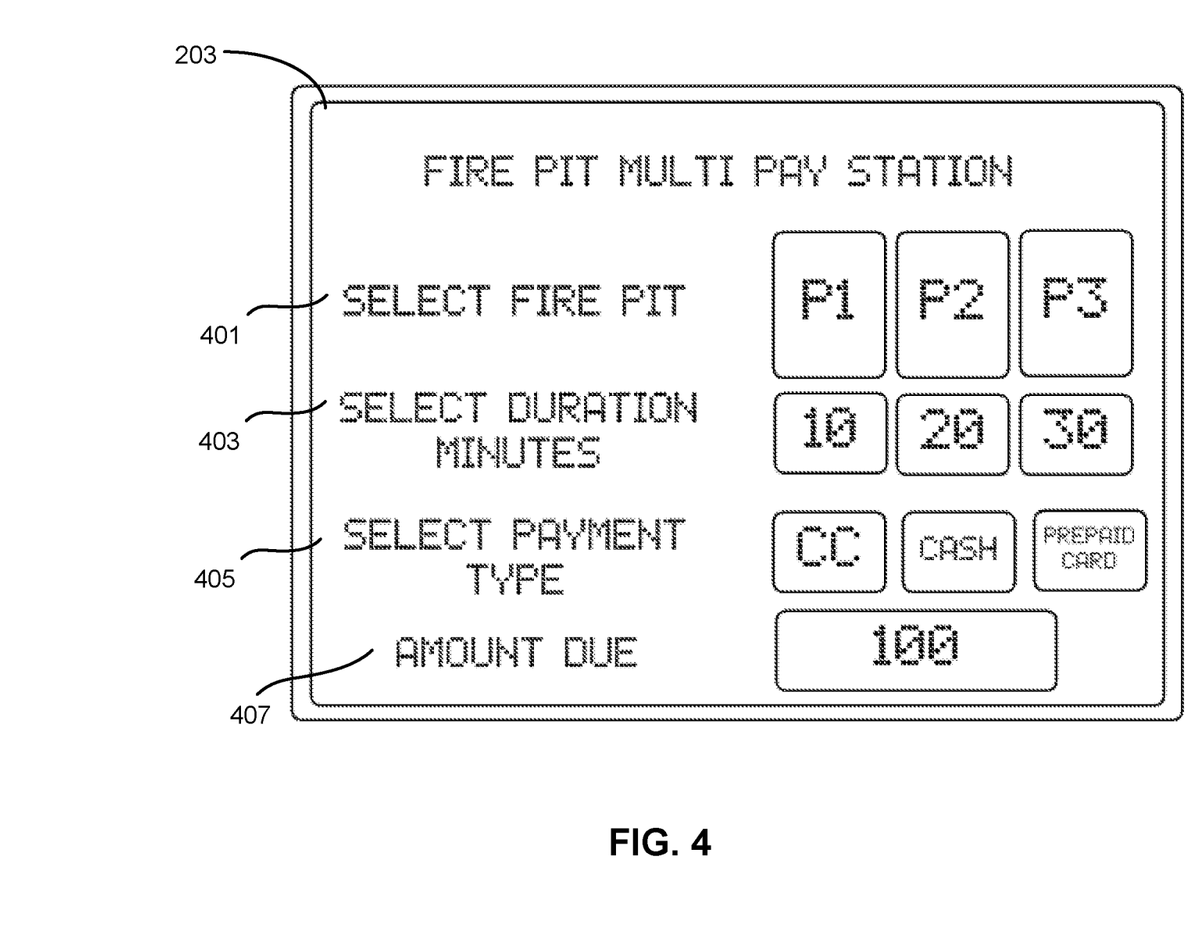
FIG. 4 illustrates a drawing of a touchscreen display of the multi-pay station, in accordance with an embodiment of the present invention.

FIG. 4 illustrates a screenshot of default display provided on the touchscreen display 203. In this illustration, multiple options from the multi pay-station 101 are provided for the customer for fire pit selection and payment transactions. These options include, for example, a "SELECT FIRE PIT" option 401 for selection of a particular fire pit, a "SELECT DURATION (in minutes)" option 403 to set the run-time of the selected fire pit, and a "SELECT PAYMENT option 405 for choosing the form of payment such as a credit card (CC), cash or prepaid card. After the customer has made the appropriate selections, an AMOUNT DUE 407 is provided to the customer to complete the transaction. In practice, any fire pit stations (P1, P2, P3 etc.) that are currently in use are automatically disabled from the touchscreen display 203 as a selectable option.

Figure 5:
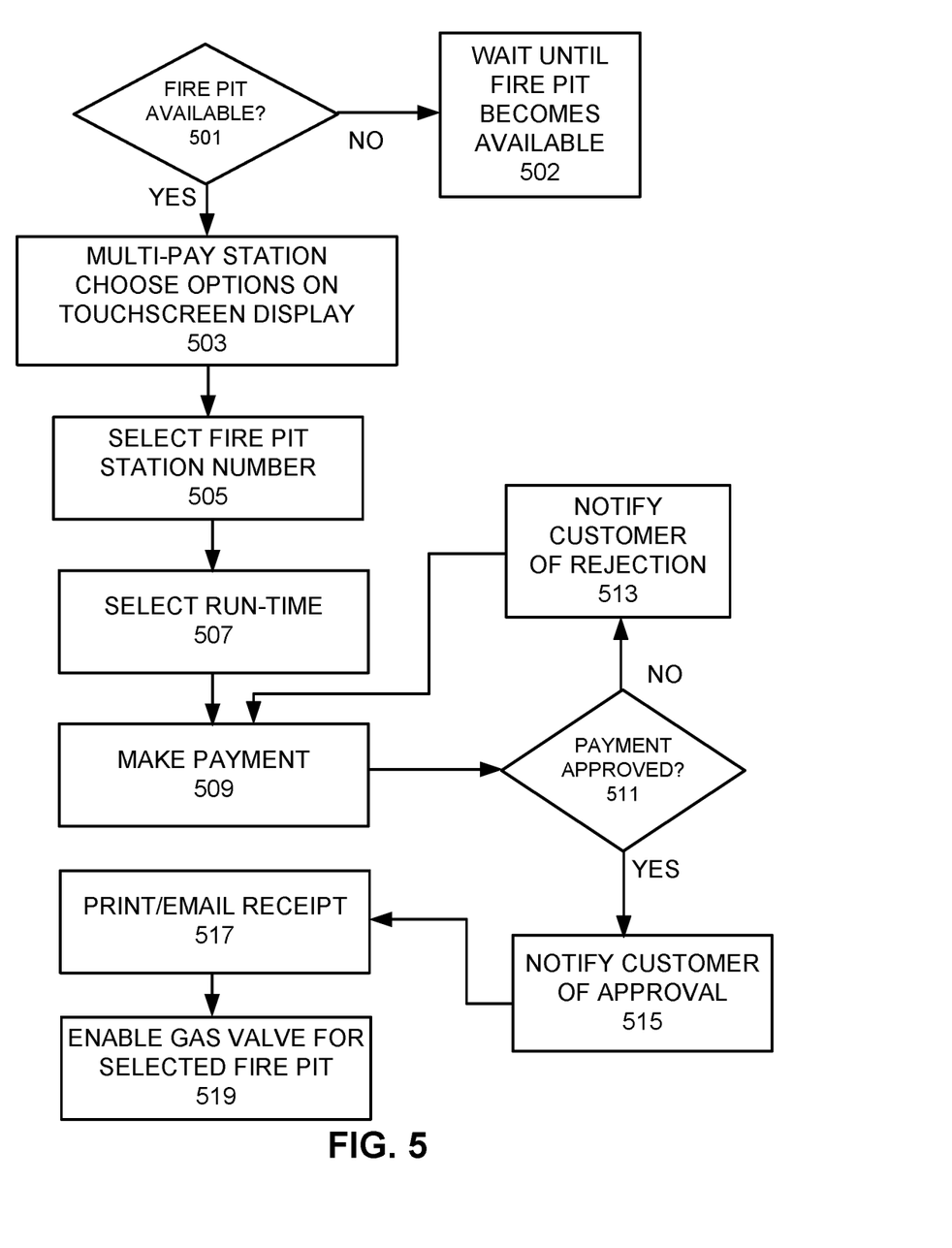
FIG. 5 illustrates a flow chart of process for initiating a service on the multi-pay station, in accordance with an embodiment of the present invention.

FIG. 5 describes the flow chart for operating the gas delivery system 100 using the multi pay-station 101. A user determines that a fire pit station (111, 112, 113) is available (step 501). If no fire pit station is available, then the user is in queue to wait until one becomes available (step 502). In practice, this determination is made on a first come first serve basis in which unoccupied fire pits are considered available to the general public. Optionally, the user may opt to be put on a waiting list on the multi pay-station 101 and request that a notification be sent by text or through a mobile app on the user's mobile device.

The displays on the digital timers (131, 132, 133) may indicate that the fire pit station is in use (RED lit screen) or available (GREEN lit screen). Upon availability of one or more of the fire pits, the user selects available options on the touchscreen display 203 of the multi pay-station 101 (step 503). Next, the user is prompted to select a fire pit station number (step 505). In practice, any occupied fire pit stations (P1, P2, P3, etc.) are automatically disabled from the touchscreen display 203 as a selectable option. The user is then prompted to select the run time to operate the fire pit station (step 507). The run-time duration may be increments of 5 minutes, 10 minutes or any pre-determined number of minutes, whereby run-time settings may be pre-configured or modified by software or firmware installed on the electronic device 302. Once a run-time duration is selected by the user, a prompt for payment (step 509) is presented to the user for the amount required to operate the fire pit station. In practice, this amount is based on the number the run-time duration and utility cost and fees to operate the gas delivery system 100. The payment amount settings may be pre-configured or modified by software or firmware installed on the main processor 302. Next, a logic operation is performed by the microprocessor of the electronic device 302 to determine payment approval and authorization (step 511). The payment approval and authorization may be verified using a remote connection through the network communication port of the electronic device 302 to a remote payment clearing house service. If the payment is not approved, a notification of rejection (step 513) is presented to the user. The payment screen is presented to the user until payment is authorized or if the user ceases to complete the transaction. If payment is approved (step 511), a notification is presented to the user of the authorized transaction (step 515), and a printout or email of a receipt (step 517) is provided to the user. Once approved, gas flow to the selected fire pit is ENABLED (step 519) and now ready for use by the user. Furthermore, after approval, the electronic device 302 may trigger a countdown timing signal to the corresponding digital timer, providing the user green lit display of the digital timer with the time remaining.

The network communication port of the electronic device 302 provides communication to the Internet whereby a remote mobile device having a customized "Mobile App" may communicate with the multi pay-station 101 to pay or make reservations for a particular fire pit station.

In an alternative embodiment, the present invention can include a gas delivery system having a single pay station provided at each fire pit location, thereby allowing for a greater variety of fire pit placement and providing an added convenience for the customer of making all transactions right next to the fire pit instead at a different location. In general terms, the gas delivery system of this embodiment is similar to that of the previous embodiment in that it includes a gas line or enlarged tank, a pay station with a user interface, an electrical connection mechanism between the gas line and pay station, and a fire pit having a protective barrier and a gas distribution end as previously described hereinabove.

Figure 6:
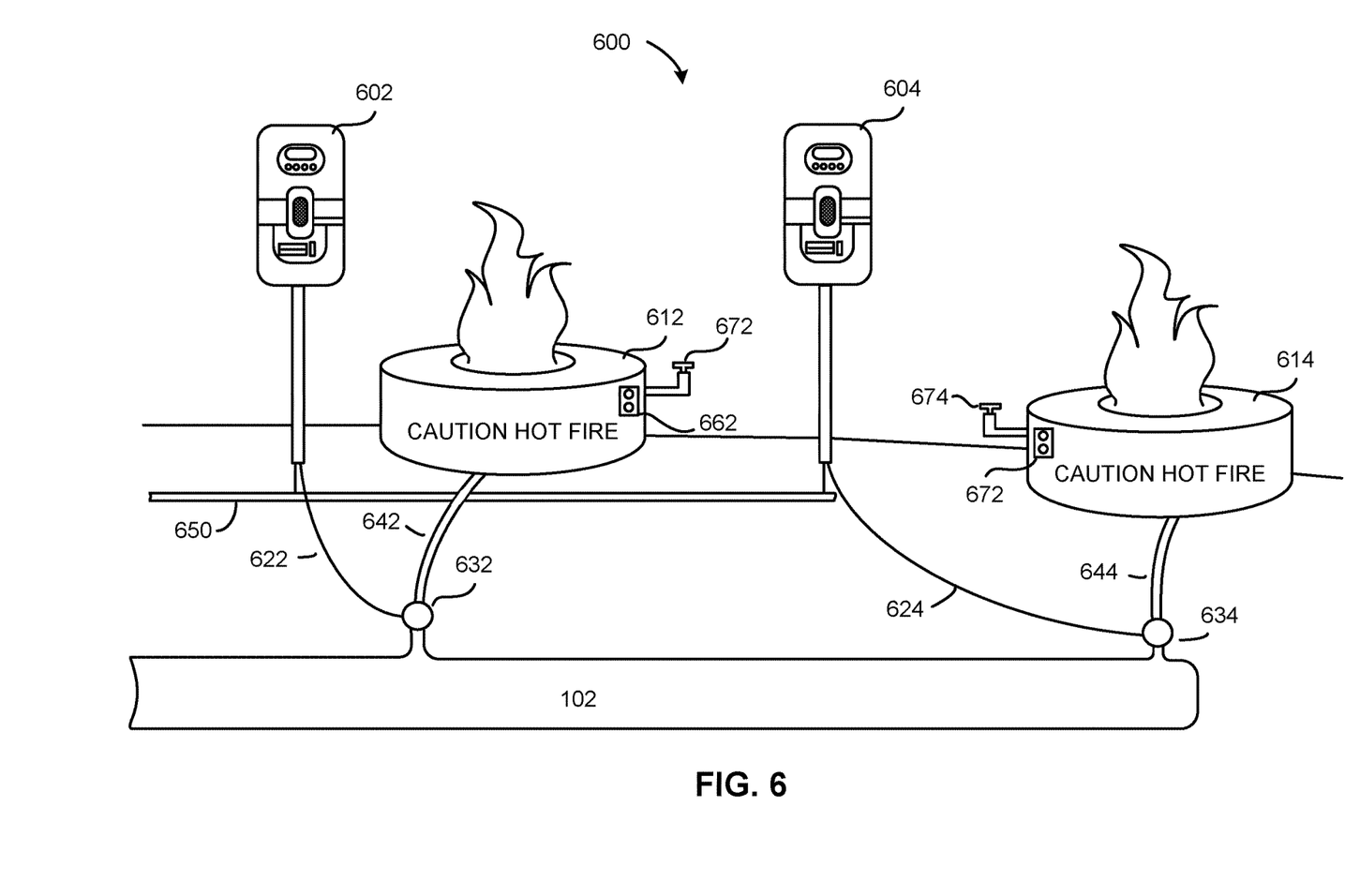
FIG. 6 illustrates a drawing of a gas fire pit delivery system with a single-pay station, in accordance with an embodiment of the present invention.

FIG. 6 illustrates a gas delivery system 600 having a single pay-station (602, 604) located next to each fire pit station (612, 614), respectively, for controlling and regulating the main gas supply 102 of natural gas or liquid propane (LP) for each fire pit (612, 614). In the gas delivery system 600, the each single pay-station (602, 604) may have its own gas valve (632, 634), respectively. Each gas valve (632, 634) is connected to its corresponding single pay-station (602, 604) by a gas controller cable (622, 624), respectively, whereby each single pay-station (602, 604) provides power and a signal to actuate its corresponding gas valve (632, 634) to deliver natural gas or liquid propane to its corresponding fire pit (612, 614) via gas line (642, 644). Each gas valve (632, 634) may include, for example, an electric solenoid valve providing on-off control of gas using a DC signal. A power and communication cable 650 may be connected to each single pay-station (602, 604), providing an external power source and data communication link to each pay-station (602, 604). Each fire pit (612, 614) may also include an optional switch (662, 664), respectively, that is used to ignite the gas fed into the fire pit and a gas flow controller (672, 674), respectively, in the form of a knob or key which controls the flame height of the fire pit.

Figure 7:
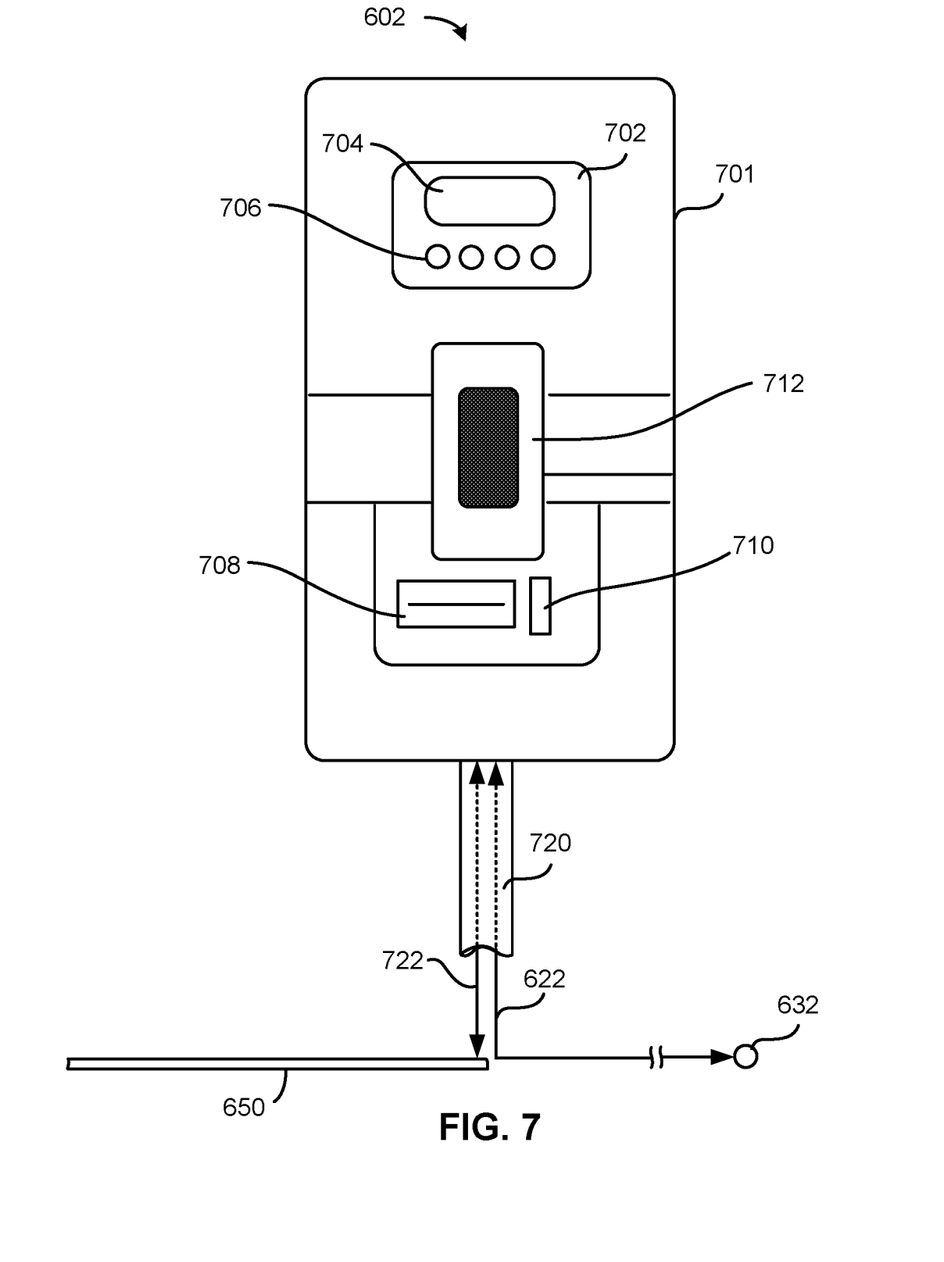
FIG. 7 illustrates a drawing of the single-pay station, in accordance with an embodiment of the present invention.

FIG. 7 illustrates an enlarged view of the single pay-station 602 which is identical to the other pay-station 604. The single pay-station 602 includes a weatherproof enclosure 701 structure for housing electrical circuitry components and hardware that operate the pay-station. The single pay-station 602 may also include a main control panel 702 having an LCD or LCD display panel 704 and selector buttons 706, a payment card reader 708, such as a point of sale terminal, or a bill or coin acceptor 710 for receiving payment from the customer, and an optional optical motion detector 712 for sensing the presence of the user at single pay-station. A hollow post 720 such as a square or round tubing may be mounted to the base of the single pay-station 602 providing support to the weatherproof enclosure 701 structure. A cavity formed in the hollow post 720 provides a pathway between the weatherproof enclosure 701 and a power line and communications wire bundle 722 and the gas controller cable 622.

Internal electrical components (not shown) of the weatherproof enclosure 701 structure may include an electronic circuit board (not shown) having an on-board microprocessor, memory (flash, ROM), display driver circuitry, network communication circuitry, and a single-channel valve controller circuitry. In practice, power and communication is provided to the single pay-station 602 via wire bundle cable 722 which is connected to the power and communication cable 650. Software or firmware may installed in memory and executed by the microprocessor to provide the single pay-station 602 operational instructions for handling payment transactions, actuating gas controller valves via gas controller cable 622, and trigging a shutoff response signal due to disable the gas valve 632 based on no activity detected by the motion sensor 712. In yet another example, if no motion is detected by the motion sensor 712, an audible or visual warning may be triggered prior to disabling the gas valve, giving time to the user to respond accordingly to prevent the gas from shutting off. In another option, there may be two trigger settings for the motion sensor. At the first trigger setting, if motion is not sensed a first stage, a first shutoff signal reduce the output of the gas so that minimal gas is flowing to the fire pit. At the second trigger setting, if motion is not sensed again after a pre-determined time has elapsed, then gas would be disabled completely and any remaining time would be reset making that fire pit available to other users.

Figure 8:
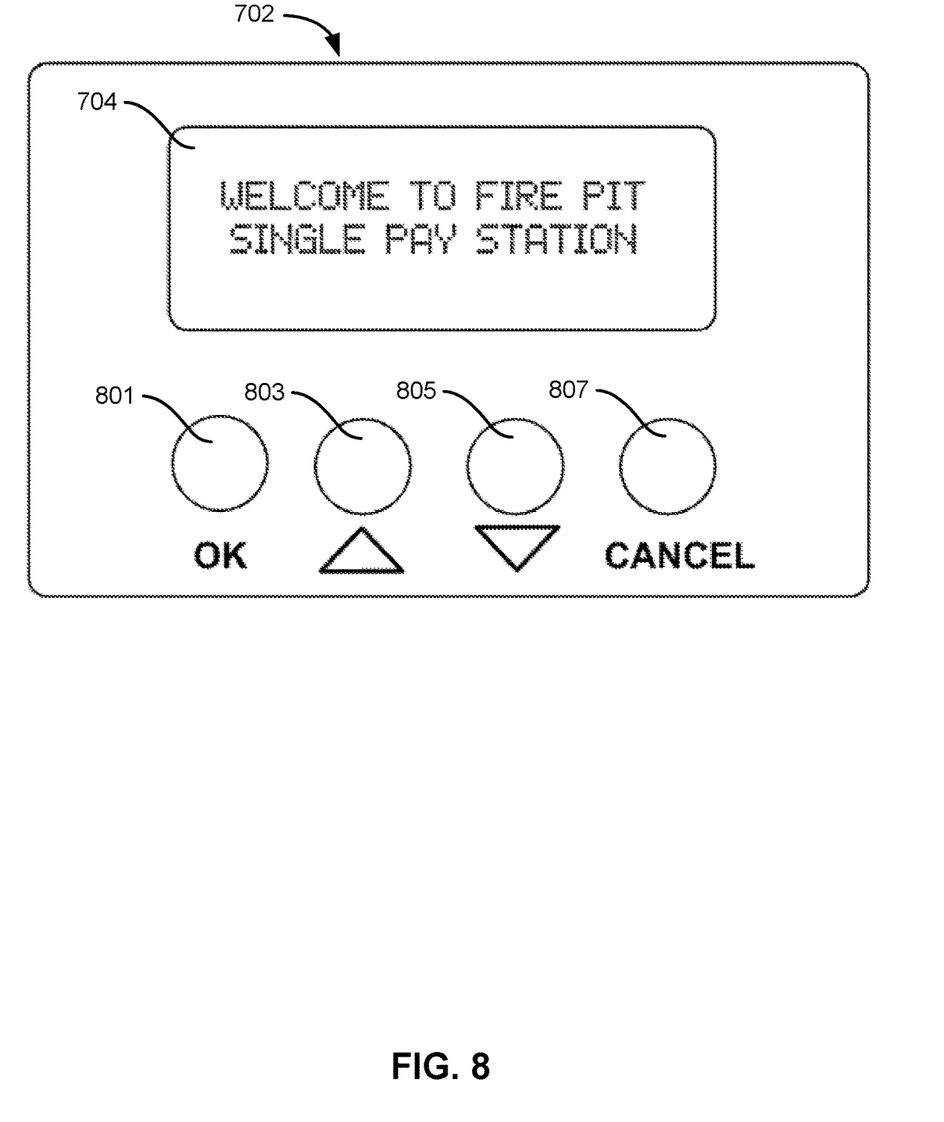
FIG. 8 illustrates a drawing of a display panel of the single-pay station, in accordance with an embodiment of the present invention.

FIG. 8 illustrates an enlarged view of the main control panel 702. In this illustration, multiple options from the single-pay station 602 are provided on the display panel 704 to customer for fire pit selection and payment transactions. These options include, for example, a "SELECT FIRE PIT" option for selection of a particular fire pit, a "SELECT DURATION (in minutes)" option to set the run-time of the selected fire pit, and a "SELECT PAYMENT option for choosing the form of payment such as a credit card (CC), cash or prepaid card. Options are selected by depressing the OK 801 or ARROW UP/DOWN (803, 805) buttons and cancelled by depressing the CANCEL button 807.

Figure 9:
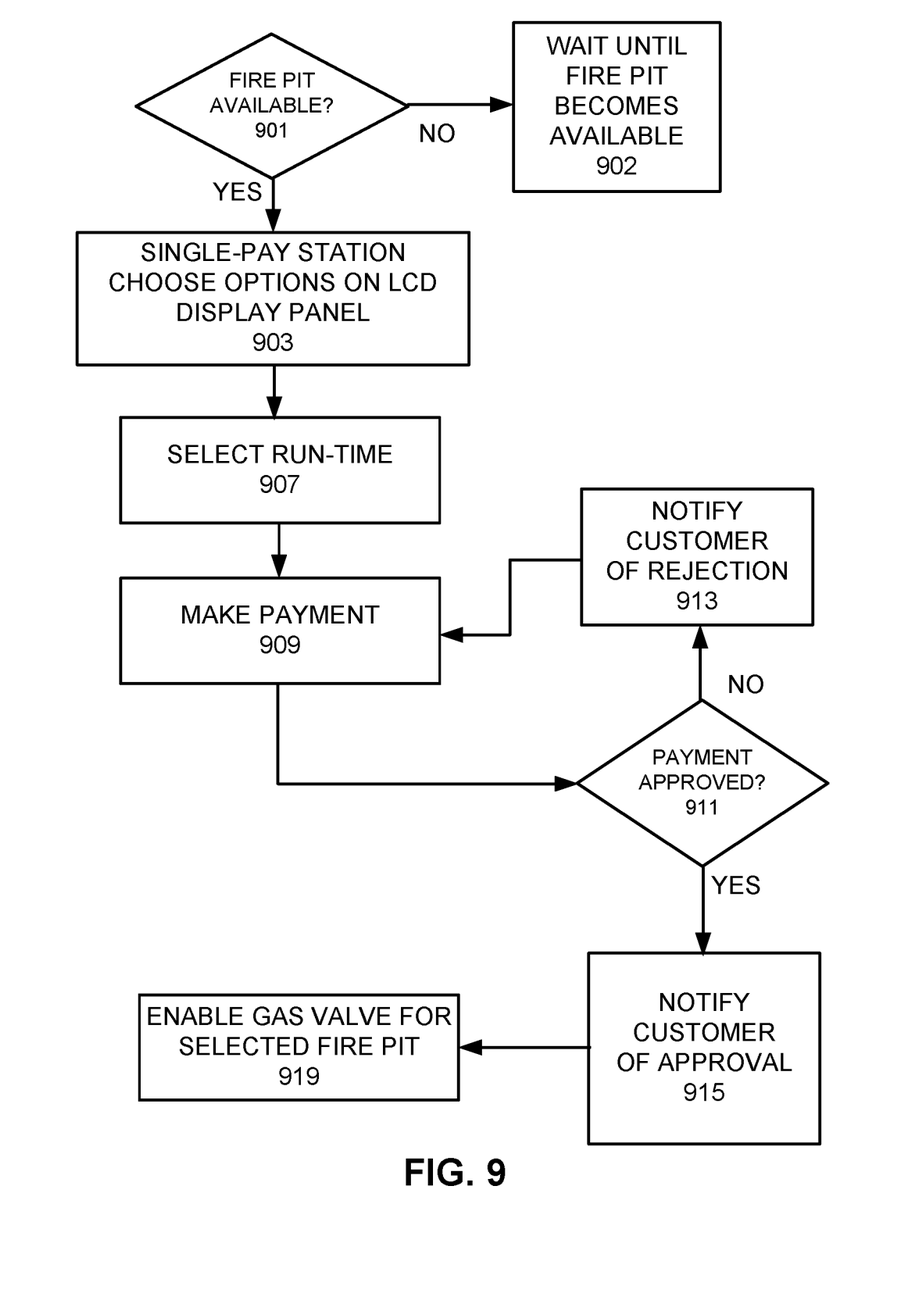
FIG. 9 illustrates a flow chart of process for initiating a service on the single-pay station, in accordance with an embodiment of the present invention.

FIG. 9 describes the flow chart for operating the gas delivery system 600 using the single pay-station pay station (602, 604). A user determines that a fire pit station (612, 614) is available (step 901). If no fire pit station is available, then the user is in queue to wait until one becomes available (step 902). In practice, this determination is made on a first come first serve basis in which unoccupied fire pits are considered available to the general public. Optionally, a timer may be displayed on the display panel 704 for the fire pit station is in use (RED lit screen) or available (GREEN lit screen). Upon availability of the fire pit, the user may select options on the display panel 704 using the selector buttons 706 (step 903). Next, the user is then prompted to select the run time to operate the fire pit station (step 907) and may use the ARROW UP/DOWN (803, 805) buttons to scroll through different run-times. The run-time duration may be increments of 5 minutes, 10 minutes or any pre-determined number of minutes, whereby run-time settings may be pre-configured or modified by software or firmware installed on the electronic circuit board of the single pay-station 602. The user may select the desired run-time by depressing the OK button 801. Once the run-time duration is selected by the user, a prompt for payment (step 909) is presented to the user for the amount required to operate the fire pit station. In practice, this amount is based on the number the run-time duration and utility cost and fees to operate the gas delivery system 600. The payment amount settings may be pre-configured or modified by software or firmware installed on the electronic circuit board of the single pay-station 602. Next, a logic operation is performed by the microprocessor of the electronic circuit board to determine payment approval and authorization (step 911). The payment approval and authorization may be verified using a remote connection through the network communication circuitry of the single pay-station 602 to a remote payment clearing house service. If the payment is not approved, a notification of rejection (step 913) is presented to the user. The payment screen (step 909) is again presented to the user until payment is authorized or if the user cancels the transaction using the cancel button 807 as to discard the transaction. If payment is approved (step 915), a notification is presented to the user on the display panel 704 of the authorized transaction (step 919). Once approved, the gas flow to the selected fire pit is ENABLED (step 919) and now ready for use by the user. Furthermore, after approval, the microprocessor of the electronic circuit board may trigger a countdown timing signal to the corresponding timer displayed on the display panel 704.

In the embodiments described hereinabove, although the embodiments show a limited number of fire pits (i.e., 3 or less), the gas vending systems may implement any number of fire pits depending on the size of the gas source provided.

All patents, patent applications, and other references cited herein are incorporated by reference in their entireties.

The disclosure has been provided merely for the purpose of explanation and is not to be construed as limiting of the present invention. Other embodiments and modifications of the present invention may occur to those of ordinary skill in the art in view of the disclosure.

What is claimed, including:

1. A gas delivery and payment system comprising:
   a payment station for receiving a form of payment and generating a signal to enable delivery of a pressurized gas;
   a plurality of fire pit stations remotely coupled to the payment station;
   a gas supply pipeline carrying the pressurized gas from a storage site to a distribution end, wherein the distribution end is coupled to a plurality of electronically-actuated gas valves, wherein each fire pit station is remotely coupled to each of the plurality of electronically-actuated gas valves through a gas coupling pipeline; and
   a controller cable having a first end coupled to the payment station and a second end coupled to each of the plurality of electronically-actuated gas valves, the payment station including a multi-channel valve controller in communication with each of the plurality of electronically-actuated gas valves, wherein the multi-channel valve controller generates a control signal to actuate at least one of the plurality of electronically-actuated gas valves for a pre-determined time period upon receipt of payment.

2. The gas delivery and payment system of claim 1, wherein the payment station further comprises a control panel having a touchscreen display.

3. The gas delivery and payment system of claim 2, wherein the control panel provides a user a list of selectable options to enable the pressurized gas to flow to a selected fire pit station.

4. The gas delivery and payment system of claim 3, wherein the list of selectable options includes fire pit station numbers, run-time duration periods, and payment options.

5. The gas delivery and payment system of claim 1, further comprising a plurality of digital timers remotely coupled to the payment station.

6. The gas delivery and payment system of claim 5, wherein each digital timer is in proximity to each fire pit station.

7. The gas delivery and payment system of claim 1, further comprising a solar panel array coupled to the payment station through a rechargeable battery, charge controller, and inverter thereby providing a backup power supply to the payment station.

8. A gas delivery and payment system comprising:
   a payment station for receiving a form of payment and generating a signal to enable delivery of a pressurized gas;
   a fire pit station coupled to the payment station, the payment station located in proximity to the fire pit station;
   a gas supply pipeline carrying the pressurized gas from a storage site to a distribution end, wherein the distribution end is coupled to an electronically-actuated gas valve, wherein the fire pit station is coupled to the electronically-actuated gas valve through a gas coupling pipeline; and
   a controller cable having a first end coupled to the payment station and a second end coupled to the electronically-actuated gas valve, the payment station including a single-channel valve controller in communication with the electronically-actuated gas valve, wherein the single-channel valve controller generates a control signal to actuate the electronically-actuated gas valve for a pre-determined time period upon receipt of payment.

9. The gas delivery and payment system of claim 8, wherein the payment station further comprises a control panel having an LCD display.

10. The gas delivery and payment system of claim 9, wherein the control panel provides a user a list of selectable options to enable the pressurized gas to flow to the fire pit station.

11. The gas delivery and payment system of claim 10, wherein the list of selectable options includes run-time duration periods and payment options.

12. The gas delivery and payment system of claim 11, further comprising a motion detector coupled to the control panel, the motion detector triggering a shut-off signal to the electronically-actuated gas valve when no movement is detected at the fire pit station.

13. The gas delivery and payment system of claim 12, wherein the motion detector includes a first trigger setting and a second trigger setting.

14. The gas delivery and payment system of claim 13, wherein the first trigger setting generates a first shutoff signal for reducing the flow of the pressurized gas to the fire pit station, and wherein the second trigger setting generates a second shutoff signal for disabling the flow of the pressurized gas to the fire pit station.

* * * * *